(12) United States Patent
Thompson

(10) Patent No.: US 6,970,691 B2
(45) Date of Patent: Nov. 29, 2005

(54) SPORTS HELMET HAVING INTEGRAL SPEAKERS

(76) Inventor: Spencer J. Thompson, 2364 Teller Rd., Suite 104, Newbury, CA (US) 91320

( * ) Notice: Subject to any disclaimer, the term of this patent is extended or adjusted under 35 U.S.C. 154(b) by 393 days.

(21) Appl. No.: 10/156,552

(22) Filed: May 28, 2002

(65) Prior Publication Data
US 2004/0204208 A1 Oct. 14, 2004

(51) Int. Cl.⁷ ................................................ H04B 1/06
(52) U.S. Cl. .................. 455/344; 455/350; 455/351; 2/422
(58) Field of Search ............................. 455/575.2, 344, 455/350, 351; 381/385, 376; 2/425; 181/129; 379/430

(56) References Cited

U.S. PATENT DOCUMENTS

| | | |
|---|---|---|
| 3,021,526 A | 2/1962 | Lastnik |
| 3,430,146 A | 2/1969 | Chua |
| 3,586,977 A | 6/1971 | Lustig |
| 3,916,312 A | 10/1975 | Campbell |
| 4,077,007 A | 2/1978 | McKinney |
| 4,109,105 A | 8/1978 | Von Statten |
| 4,227,520 A | 10/1980 | Lord |
| 4,321,433 A | 3/1982 | King |
| 4,607,395 A | 8/1986 | Sundahl |
| 4,845,751 A | 7/1989 | Schwab |
| 4,888,805 A | 12/1989 | Karppala |
| 5,142,700 A | 8/1992 | Reed |
| 5,465,421 A * | 11/1995 | McCormick et al. ........ 455/344 |
| 5,525,989 A * | 6/1996 | Holt ............................. 342/20 |
| 5,691,514 A * | 11/1997 | Landis ........................ 181/129 |
| 6,017,049 A * | 1/2000 | Spector .................... 455/575.2 |
| 6,075,857 A * | 6/2000 | Doss et al. .................. 379/430 |
| 2003/0163827 A1 * | 8/2003 | Purpura ....................... 725/105 |

FOREIGN PATENT DOCUMENTS

| | | |
|---|---|---|
| JP | 53023601 A | 3/1978 |
| JP | 55090197 A | 7/1989 |

* cited by examiner

Primary Examiner—Joseph Feild
Assistant Examiner—Huy D. Nguyen
(74) Attorney, Agent, or Firm—Kelly Lowry & Kelley, LLP

(57) ABSTRACT

A sports helmet includes a liner comprised of impact resistant material and a protective shell encasing an outer surface of the liner. A female audio jack is secured within a rear cavity of the liner and has an aperture extending without the liner for receiving a male audio jack connected to a portable audio device. A pair of cavities are formed on opposite sides of the liner in which are secured speakers. Wiring extends from the female audio jack to the integral speakers. The speakers are positioned and oriented such so as to provide audio to the helmet wearer without blocking surrounding sound, and without affecting the safety aspects of the helmet.

16 Claims, 4 Drawing Sheets

SPORTS HELMET HAVING INTEGRAL SPEAKERS

BACKGROUND OF THE INVENTION

The present invention generally relates to protective head gear used during sporting activities, such as bicycle helmets, roller skating helmets, skateboarding helmets, snow boarding helmets, and skiing helmets. More particularly, the present invention relates to a sports helmet having integral speakers and an audio jack for connection to a portable audio device to allow the wearer to listen to music or other desirable sounds during the sporting activity.

In recent years, it has been customary, and often mandatory, for bicycle riders and others to wear helmets to protect their heads from injury in case of an accident. Sports activities can be more enjoyable while listening to music or other audio entertainment. Many portable radios, tape players, compact disk players, MP3 players and the similar sound generating devices exist which facilitate such listening during sports activities. Accordingly, it is well-known that bicycle riders, roller bladers, skate boarders and the like wear headphones over their ears to listen to music and other audio material while riding. However, positioning the head phones directly over or even into the ears prevents the rider from hearing important sounds like traffic, police cars and fire trucks. This practice can be very dangerous and is illegal in some states. Also, maintaining the speakers in the ears during such sporting activities is difficult due to the movements during the activity.

There are known helmets which have integral speakers. For example, there exist designs for football helmets having integral audio speakers and an antenna for reception of audio signals. However, the design of such helmets is not applicable to bicycle and skating helmets as the ears of the rider are typically not covered by the protective helmet, and the rider typically desires to listen to music provided through a portable device, such as the aforementioned tape players, compact disk players and the like.

There are also known many motorcycle helmets having speakers fixed to the interior of the helmet. Typically, microphones are attached to the helmet to provide motorcycle riders the ability to speak to one another. A male jack often extends from an end of an electrical cord for insertion into a female jack of audio equipment built into the motorcycle for the listening of music, etc. Alternatively, the helmets include antennas and the like for reception of audio signals, typically radio frequency signals, emitted from the other riders microphone system, or local radio stations. However, these motorcycle sound systems are fairly complicated and not implementable into the bicycle and skating helmets of the present invention. Also, the speakers of such systems are often placed directly over the ear of the wearer of the motorcycle helmet, and, with the hard shell exterior of the motorcycle helmet covering the ear, shields external sounds from being adequately heard by the wearer.

U.S. Pat. No. 5,465,421 issued on Nov. 7, 1995 to McCormick et al, discloses a sports helmet with portable audio sound producing capabilities. The patent claims a kit for converting an existing sports helmet for portable audio sound producing capabilities by attaching speakers and wiring to a lower rim portion of the helmet using prongs and mating projections. However, the inventors of the present invention believe that this design is not as appealing as an integral speaker system built into a sports helmet. Also, the McCormick helmet places the speakers very close to the ears and oriented such that the sound and music is directed into the ear canal of the wearer. As described above, this can be dangerous.

Accordingly, there is a continuing need for a sports helmet having integral speakers which are attachable to a portable audio device and safely positioned and oriented. The present invention fulfills this need and provides other related advantages.

SUMMARY OF THE INVENTION

The present invention resides in a sports helmet having integral speakers. The sports helmet generally comprises a liner composed of impact resistant material configured to form a helmet. A protective shell encases an outer surface of the liner. Typically, the sports helmet comprises a bicycle or skating helmet used during activities such as bicycling, skiing, snow boarding or skating and includes adjustable straps for securing the helmet onto the wearer.

A cavity is formed in the rear portion of the liner, and a female audio jack is secured therein. The female audio jack has an aperture extending without the liner for receiving a male audio jack operably connected to a portable audio device, such as by electrical wiring extending between the helmet and a cassette tape player, compact disk player, MP3 player, etc. It is contemplated that the audio device could be built-into the helmet if such digital devices become small enough so as not to compromise the safety of the helmet.

Speakers are positioned with the protective shell generally opposite from one another and directed toward a head of a wearer above the ears of the wearer so as to provide audio to the helmet wearer without blocking surrounding sound. Such speakers may include waver-thin or flat speakers attached to an outer or inner surface of the liner. Alternatively, in a preferred embodiment, a pair of cavities are formed in opposite sides of the liner so as to be positioned in front of the ears, but behind the temples of a wearer of the sports helmet. The cavities each include a first cavity formed in an exterior surface of the liner and approximating the outer diameter of the speakers. A second cavity is contiguous with the first and extends through the liner. The second cavity is of a smaller cross-sectional diameter than the first cavity to prevent the speaker from traveling therethrough. In a particularly preferred embodiment, the second cavity comprises a plurality of cavities, at least one of which may extend downwardly at an angle towards the wearer's ear. Preferably, the cavities that house the speakers are formed below a hit-line of the helmet.

Wiring extends from the female audio jack to the speakers. The wiring can be disposed within the liner, such as by channels formed in an outer surface of the liner, or the wiring can be disposed between the liner and the shell.

In this manner, a protective helmet for reducing injuries in the event of an accidental fall, spill or collision is retained, while allowing the wearer to enjoy music or other audio from a portable device.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
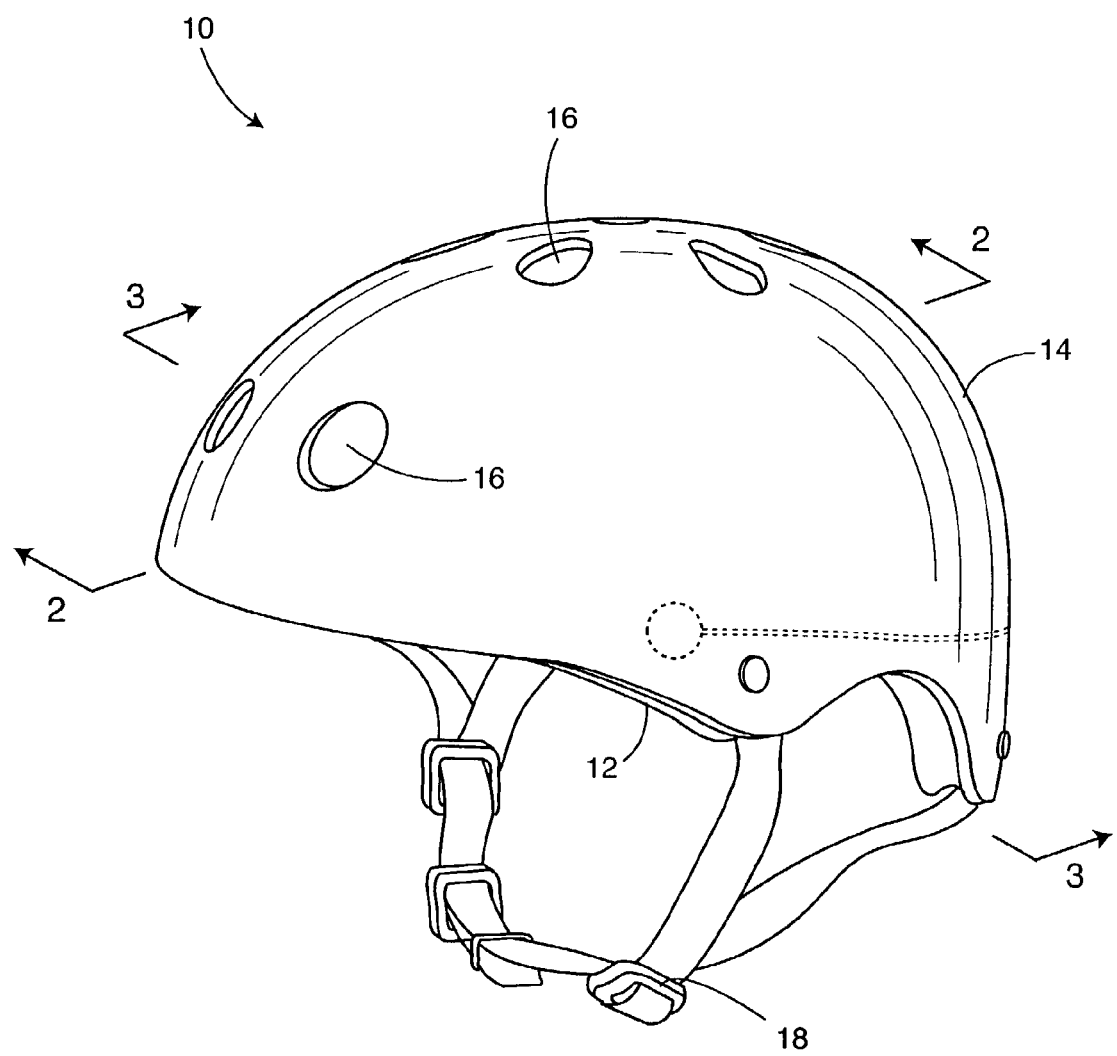
FIG. 1 is a perspective view of a sports helmet having integral speakers, in phantom, in accordance with the present invention.

As shown in the drawings for purposes of illustration, the present invention resides in a sports helmet, generally referred to by the reference number 10, that allows the wearer to listen to music or other desirable sounds while bicycling or skating.

Figure 2:
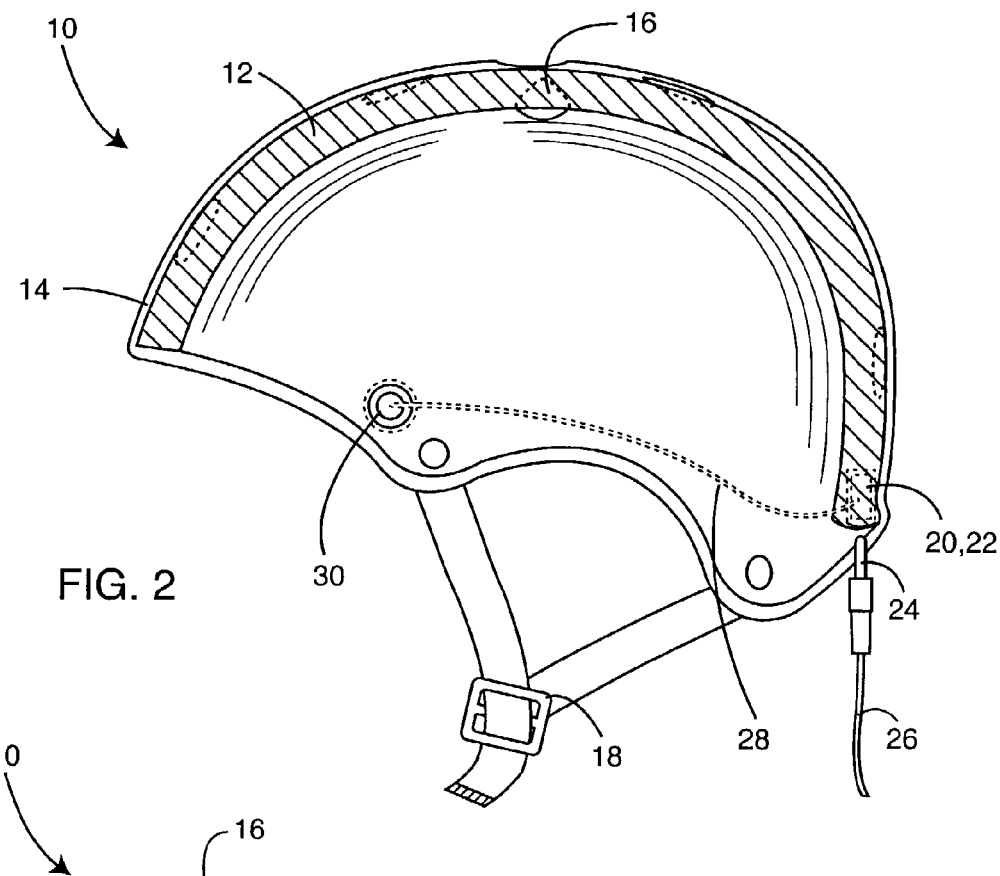
FIG. 2 is a cross-sectional view taken generally along line 2—2 of FIG. 1, illustrating a male jack being inserted into a female audio jack of the helmet, and the positioning of the jack, wiring, and speakers below a hit-line of the helmet.
Figure 3:
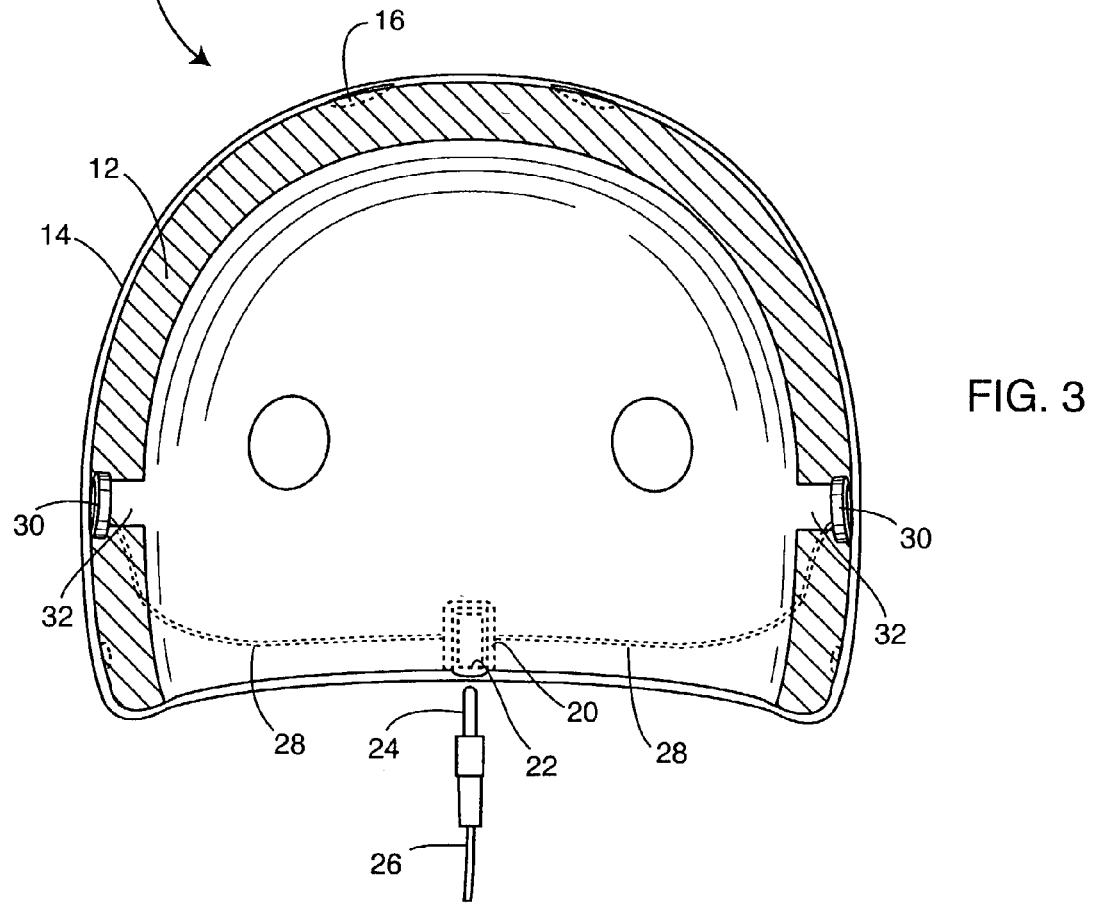
FIG. 3 is a cross-sectional view taken generally along line 3—3 of FIG. 1, illustrating the preferred orientation of the speakers.
Figure 4:
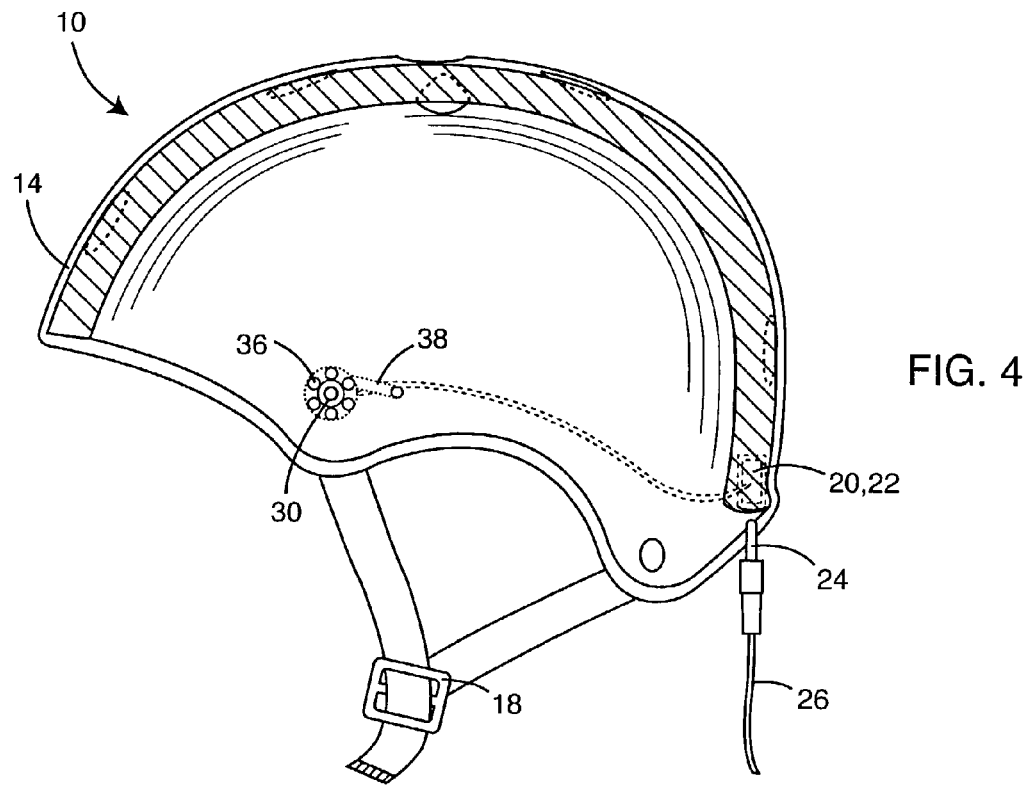
FIG. 4 is a cross-sectional side view of a helmet embodying the present invention and having a series of secondary cavities or ports formed through the liner.
Figure 5:
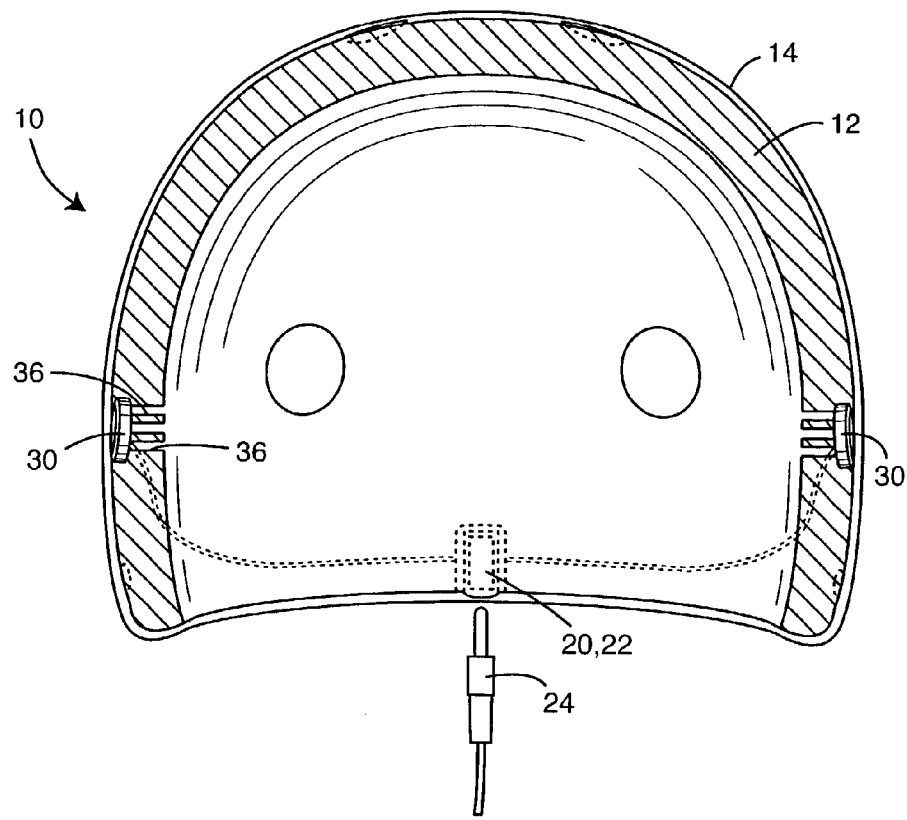
FIG. 5 is a cross-sectional view viewed from the rear of the helmet, illustrating the plurality of ports of FIG. 4.

With reference to FIGS. 1–3, the sports helmet 10 includes an inner liner 12 constructed of impact resistant material, such as expanded polystyrene capable of dissipating and absorbing impact forces as is well-known in the art. The liner is configured to form a helmet so as to be positionable on a head of the wearer. An outer protective shell 14, typically comprised of ABS hardshell, polycarbonate microshell or, other plastic hardshell encases an outer surface of the liner 12. The helmet 10 may include vent apertures 16 to promote circulation of air while riding to minimize perspiration and discomfort. Preferably, the helmet 10 includes straps 18 having buckles or the like for adjustably and removably securing the helmet 10 to a wearer's head.

The helmet 10 is sized so as to surround a crown of the wearer's head, and not cover the ears of the wearer. Such helmets have what is known in the art as a Consumer Products Safety Commission's (CPSC's) "hit-line". This is the lower limit where the helmet can be impacted in the testing of the helmet for safety purposes. Impact testing is not performed on portions of the helmet below this line. This "hit-line" may be different between helmets having different configurations, designs, and sizes.

With particular reference now to FIGS. 2 and 3, a cavity 20 is formed, such as during the manufacturing of the helmet 10, in a rear and lower portion of the liner 12, preferably below the "hit-line". The cavity is sized and configured such to accept a female audio jack 22. The female audio jack includes an aperture extending without the liner 12, typically facing downwardly so as to extend only through the liner 12, and not the shell 14, for acceptance of a male audio jack 24 attached to electrical wiring 26 extending from the portable electronic audio device. While it is most desirable to install and conceal the jack 24 into the liner 12 at the back of the helmet 10, it would be possible to design a helmet 10 that could accomplish the same effect without having the cavity in the liner. The jack could be housed outside or below the liner. Also, the jack could be oriented sideways, or any other angle, depending upon the styling of the helmet. What is important is that the jack and core interfere with the wearer as little as possible. The audio device (not shown) can comprise any suitable audio device including a radio, compact disk player, tape recorder, MP3, or the like, which can be carried in a pocket of a wearer's clothing, or may be attached to the wearer's belt or other suitable attachment point by a clip or the like.

Speaker wiring 28 extends from the female audio jack 22 to speakers 30 mounted just in front of the attachment point of the strap 18 in front of and above the ear area, but behind the temple/forehead area of the helmet 10. Cavities 32 are formed in the liner 12 at this position for acceptance of the speakers 30. The cavities 32 are configured to accept the speakers 30 towards an outer surface of the liner 12. The cavities extend into the interior of the helmet 10 to provide a unimpeded sound. Typically, the cavities 32 are configured so as to be of enlarged cross-sectional diameter where the speakers 30 are attached, and of reduced cross-sectional diameter throughout the width of the liner 12 to prevent the speakers 30 from entering into the helmet due to the jostling, movement, etc. experienced by the rider of the skate or bicycle.

The speakers 30, as described above, are mounted in front of the ears of the wearer. They are positioned and oriented so as to project downward and rearward towards the ear canal of the wearer. This provides the best sound, while enabling the wearer to hear outside noises and sound for safety purposes. Prior art helmets have been known the position the speakers directly over the wearer's ears, or above the wearer's ears, presenting either a safety concern, or a sound quality concern. The positioning and orientation of the speakers of the present invention alleviate these concerns.

Figure 6:
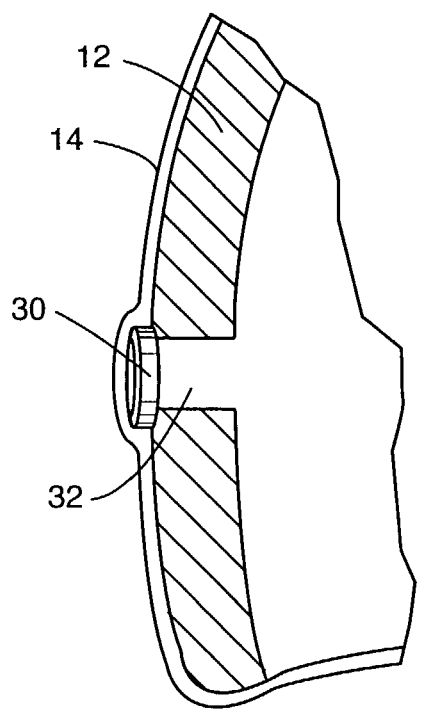
FIG. 6 is a fragmented cross-sectional view of a speaker positioned between a protective casing and a liner of the helmet.
Figure 7:
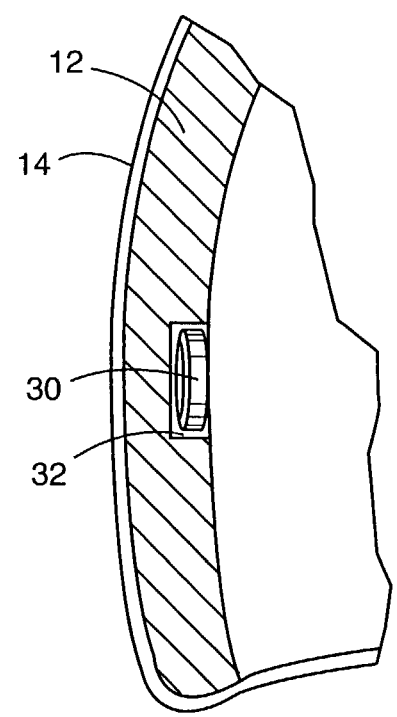
FIG. 7 is a fragmented cross-sectional view of a speaker positioned within a recess of the liner.
Figure 8:
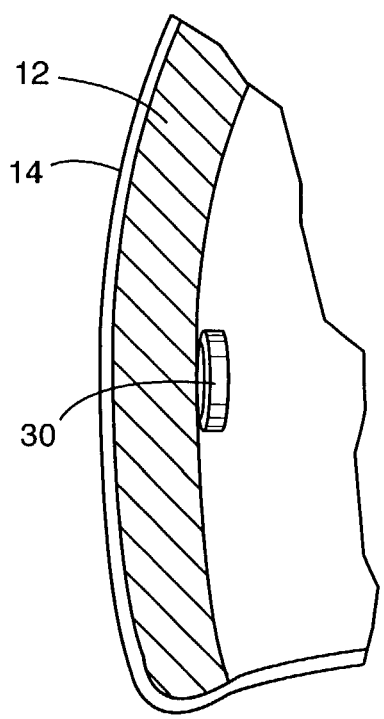
FIG. 8 is a fragmented cross-sectional view of a wafer speaker positioned on an inner surface of the liner of the helmet.

With reference to FIGS. 4–8, the speaker and cavity arrangement may vary. As shown in FIG. 7, the speaker may reside within a recess 34 formed on an inner surface of the liner 12. Alternatively, as shown in FIGS. 6 and 8, a wafer-thin or "flat" speaker which has recently become available may be placed between the hardshell 14 and liner 12 and over a cavity 32, or even adhered onto an inner surface of the liner 12 as shown in FIG. 8.

In a particularly preferred form of the invention, the speaker 30 is positioned within a first cavity formed in an outer surface of the liner 12 approximating the diameter of the speaker 30. A plurality of secondary cavities 36 are formed in the inner liner 12, similar to a salt-shaker design, so that sound may travel through the liner 12, yet the liner 12 is still sufficiently strong and protective at the point of speaker placement. At least one of the ports or cavities 38 may extend downwardly towards the ear of the wearer so as to channel at least a portion of the sound directly towards the wearer's ears to enhance sound quality, while still not posing a safety concern.

The wiring 28 may be disposed between the liner 12 and shell 14. However, in a particularly preferred embodiment, the wiring 28 is mounted into channels or other cavities (not shown) in the exterior surface or part of the inner liner 12. The speakers 30, wiring 28, and female jack 22 are all positioned below the "hit-line" of the helmet 10. The entire assembly is then covered and protected by the outer shell 14.

It is contemplated that the speakers 30 have receiving means associated therewith for receiving a signal from a transmitter of a wireless portable audio device. It is also contemplated that the helmets 10 have built-in two-way communication capability, so that a wearer could use a two-wave radio or even a mobile phone with the helmet 10 and converse with a fellow rider.

It will be appreciated by the reader that the helmet 10 of the present invention can be used without attachment to a portable audio device and provide the same degree of protection as is normally expected. However, if the wearer desires to listen to music or other audio information, the user merely needs insert male jack 24 into female audio jack 22 and clip the portable audio device to his or her clothing for audio music enjoyment during the recreational activity.

Although several embodiments of the present invention have been described in detail for purposes of illustration, various modifications may be made without departing from the spirit and scope of the invention. Accordingly, the invention is not to be limited, except as by the appended claims.

What is claimed is:

1. A sports helmet having integral speakers, comprising:
    a liner comprised of impact resistant material configured to form a helmet;
    a protective shell encasing an outer surface of the liner;
    a pair of speakers positioned within the protective shell generally opposite from one another and directed toward a head of a wearer above the ears of the wearer so as to provide audio to the helmet wearer without blocking out surrounding sound; and
    means for receiving a signal from a portable audio device;
    a pair of cavities formed in opposite sides of the liner so as to be directed toward a head of a wearer above the ears of the wearer so as to provide audio to the helmet wearer without blocking out surrounding sound, wherein the cavities each include a first cavity formed in an exterior surface of the liner and approximating the outer diameter of the speakers, and a second cavity contiguous with the first and extending through the liner, the second cavity being of a smaller cross-sectional diameter than the first cavity.

2. The sports helmet of claim 1, wherein the second cavity comprises a plurality of cavities.

3. The sports helmet of claim 2, wherein the plurality of cavities include a cavity that extends downwardly at an angle towards the wearer's ear.

4. The sports helmet of claim 1, wherein the cavities are formed below a hit-line of the helmet.

5. The sports helmet of claim 1, wherein the receiving means comprises a female audio jack secured within a rear cavity formed in the liner and having an aperture extending without the liner for receiving a male audio jack operably connected to a portable audio device and wiring extending from the female audio jack to the speakers.

6. The sports helmet of claim 5, wherein the wiring is disposed between the liner and the shell.

7. The sports helmet of claim 5, wherein the wiring is fitted within channels formed in an outer surface of the liner.

8. The sports helmet of claim 1, wherein the receiving means comprises a wireless receiver tuned to a wireless transmitter of the portable audio device.

9. The sports helmet of claim 1, wherein the sports helmet is a bicycle helmet, skating helmet, skiing helmet, or snowboarding helmet.

10. A sports helmet having integral speakers, comprising:
    a liner comprised of impact resistant material configured to form a helmet;
    a protective shell encasing an outer surface of the liner;
    a cavity formed in a rear portion of the liner;
    a female audio jack secured within the rear cavity and having an aperture extending without the liner for receiving a male audio jack operably connected to a portable audio device;
    a pair of cavities formed in opposite sides of the liner so as to be positioned above ears and behind temples of a wearer of the sports helmet;
    a speaker secured within each side cavity and oriented towards the helmet wearer's head so as to provide audio to the helmet wearer without blocking out surrounding sound;
    wiring extending from the female audio jack to the speakers; and
    adjustable straps for securing the helmet onto the wearer;
    wherein the cavities each include a first cavity formed in an exterior surface of the liner and approximating the outer diameter of the speakers, and a second cavity contiguous with the first and extending through the liner, the second cavity being of a smaller cross-sectional diameter than the first cavity.

11. The sports helmet of claim 10, wherein the second cavity comprises a plurality of cavities.

12. The sports helmet of claim 11, wherein the plurality of cavities include a cavity that extends downwardly at an angle towards the wearer's ear.

13. The sports helmet of claim 1, wherein the speaker is positioned between the liner and the protective shell.

14. The sports helmet of claim 13, wherein the speaker comprises a thin wafer speaker.

15. The sports helmet of claim 1, wherein the speaker is positioned between the liner and the wearer's head.

16. The sports helmet of claim 15, wherein the speaker comprises a thin wafer speaker.

* * * * *